E. G. JOHANSON.
LIGHT RAYS REFRACTOR.
APPLICATION FILED OCT. 19, 1916.

1,263,065.

Patented Apr. 16, 1918.

Emil G. Johanson
INVENTOR.

BY
ATTORNEYS.

UNITED STATES PATENT OFFICE.

EMIL G. JOHANSON, OF CHICAGO, ILLINOIS.

LIGHT-RAYS REFRACTOR.

1,263,065.  Specification of Letters Patent.  Patented Apr. 16, 1918.

Application filed October 19, 1916.  Serial No. 126,539.

*To all whom it may concern:*

Be it known that I, EMIL G. JOHANSON, a subject of the King of Sweden, residing at Chicago, in the county of Cook and State of Illinois, have invented new and useful Improvements in Light-Rays Refractors, of which the following is a specification.

This invention relates to glass structures having a surface so formed that light rays are transmitted diffusely, and its object is to provide a novel and improved structure of this kind in which the surface of the glass is provided with an arrangement of protuberant lenses whereby the object sought is most effectively attained.

In order that the invention may be better understood, reference is had to the accompanying drawing in which—

Figure 1:
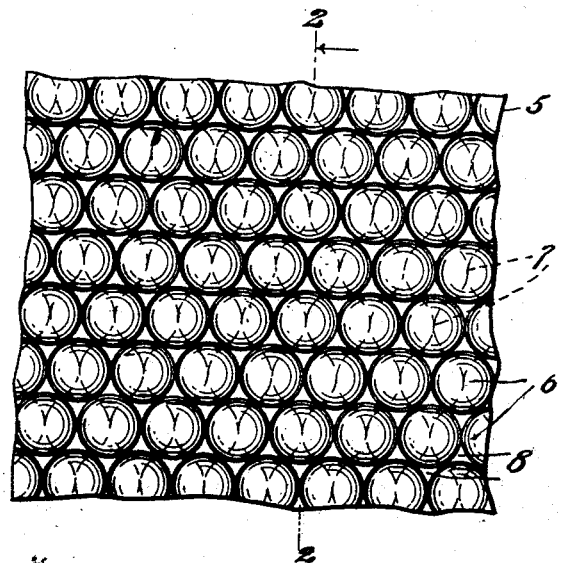
Figure 1 is a plan view of a fragment of the glass.
Figure 2:
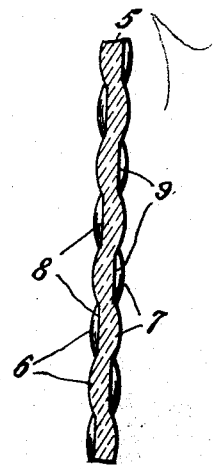
Fig. 2 is a cross section on the line 2—2 of Fig. 1.
Figure 3:
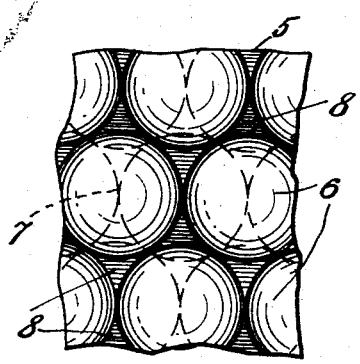
Fig. 3 is an enlarged plan view of a fragment of the glass.
Figure 4:
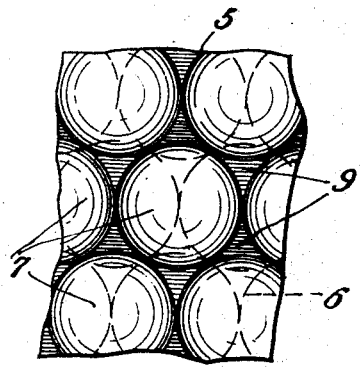
Fig. 4 is a similar view showing the opposite side of the glass.

Referring specifically to the drawing 5 denotes a flat or otherwise formed sheet of glass having both of its faces provided with protuberant circular convex lenses, the lenses on one face or side being shown at 6 and those on the other face at 7. On both sides of the glass, the lenses are arranged in straight parallel rows, and the lenses of one row are located at an angle of sixty degrees with respect to the lenses of the adjacent row. By arranging the lenses in this manner the closest setting is possible, and a maximum number of lenses in a given area may be provided. The lenses are arranged tangentially with respect to each other, with flat surfaces between the non-contiguous portions of the lenses. The surfaces are denoted by the reference character 8 on one side of the sheet and by the reference character 9 on the other side.

The relative arrangement of the lenses of the respective sides of the glass results in the flat surfaces between the lenses on one side being completely over-lapped or covered by the lenses on the other side, the lenses coinciding with said surfaces. Thus, no direct light rays or singly-deflected rays can pass through the glass without passing through the lenses, and every ray must pass through two lenses, with the result that there is a maximum diffusion of light without dark spots. While a maximum of diffusion is more possible with an infinite number of angular lenses, a great number of dark spots would result by such form of lenses, whereas with the present arrangement a maximum diffusion ensues without introducing dark spots. The rows of lenses on both sides of the sheet coincide and the lenses of the respective coinciding rows are arranged in staggered relation, whereby the overlapping of the flat surfaces on one side by the lenses on the other side is produced.

The glass has a wide range of application, and it can be used in any place where a ground or other translucent glass is desired. The glass will be found particularly useful for motor vehicle headlights to eliminate or reduce the objectionable intense glare, and also for office partitions, windows, etc.

I claim:

1. A glass structure having both of its sides formed with protuberant lenses arranged in straight parallel rows, the lenses of one row being located at an angle of sixty degrees with respect to the lenses of the adjacent row on the same side.

2. A glass structure having both of its sides formed with protuberant lenses arranged in straight parallel rows, the lenses of one row being located at an angle of sixty degrees with respect to the lenses of the adjacent row, and the lenses of the respective sides being staggered.

3. A glass structure having both of its sides formed with protuberant lenses arranged tangentially with respect to each other and in straight parallel rows, the lenses of one row being located at an angle of sixty degrees with respect to the lenses of the adjacent row.

4. A glass structure having both of its sides formed with protuberant lenses arranged tangentially with respect to each other and in straight parallel rows, the lenses of one row being located at an angle of sixty degrees with respect to the lenses of the adjacent row, and the lenses of the respective sides being staggered.

5. A glass structure having both of its sides formed with protuberant lenses arranged tangentially in straight parallel rows, the rows of lenses on the respective sides coinciding, and the lenses of said coinciding rows being staggered.

6. A glass structure having both of its sides formed with protuberant lenses arranged tangentially, with flat surfaces between the non-contiguous portions of the lenses, and the lenses on one side being positioned to coincide with said flat surfaces on the opposite side.

In testimony whereof I affix my signature.

EMIL G. JOHANSON.